United States Patent [19]
Waymouth

[11] Patent Number: 5,834,904
[45] Date of Patent: Nov. 10, 1998

[54] MEANS FOR SUPPRESSING ELECTROMAGNETIC INTERFERENCE FROM RF-EXCITED LIGHT SOURCES

[75] Inventor: John F. Waymouth, Marblehead, Mass.

[73] Assignee: Matsushita Electric Works R&D Lab., Woburn, Mass.

[21] Appl. No.: 534,160

[22] Filed: Sep. 26, 1995

[51] Int. Cl.$^6$ .................................................. H05B 37/00
[52] U.S. Cl. ........................ 315/248; 315/85; 315/344; 313/607
[58] Field of Search ............................. 315/85, 248, 267, 315/344; 313/112, 607, 110, 113, 492, 493

[56] References Cited

U.S. PATENT DOCUMENTS 4,568,859  2/1986  Houkes et al. .......................... 315/248
5,387,850  2/1995  Bray et al. ............................... 315/242

FOREIGN PATENT DOCUMENTS 534382  1/1978  Japan.
546380  1/1979  Japan.
132368  10/1979  Japan.

*Primary Examiner*—Robert Pascal
*Assistant Examiner*—David Vli
*Attorney, Agent, or Firm*—Jerry Cohen

[57] ABSTRACT

EMI suppression in electrodeless discharge lamps by inward RF-reflectance from the enclosure walls (12) of 90%+ and use of an absorber (16) of RF power having an absorption coefficient greater than 40%, a transmission coefficient less than $e^{-3}$, and an effective area facing the interior of the enclosure between 5% and 40% of the area of the RF-reflective light transmissive enclosure.

15 Claims, 10 Drawing Sheets

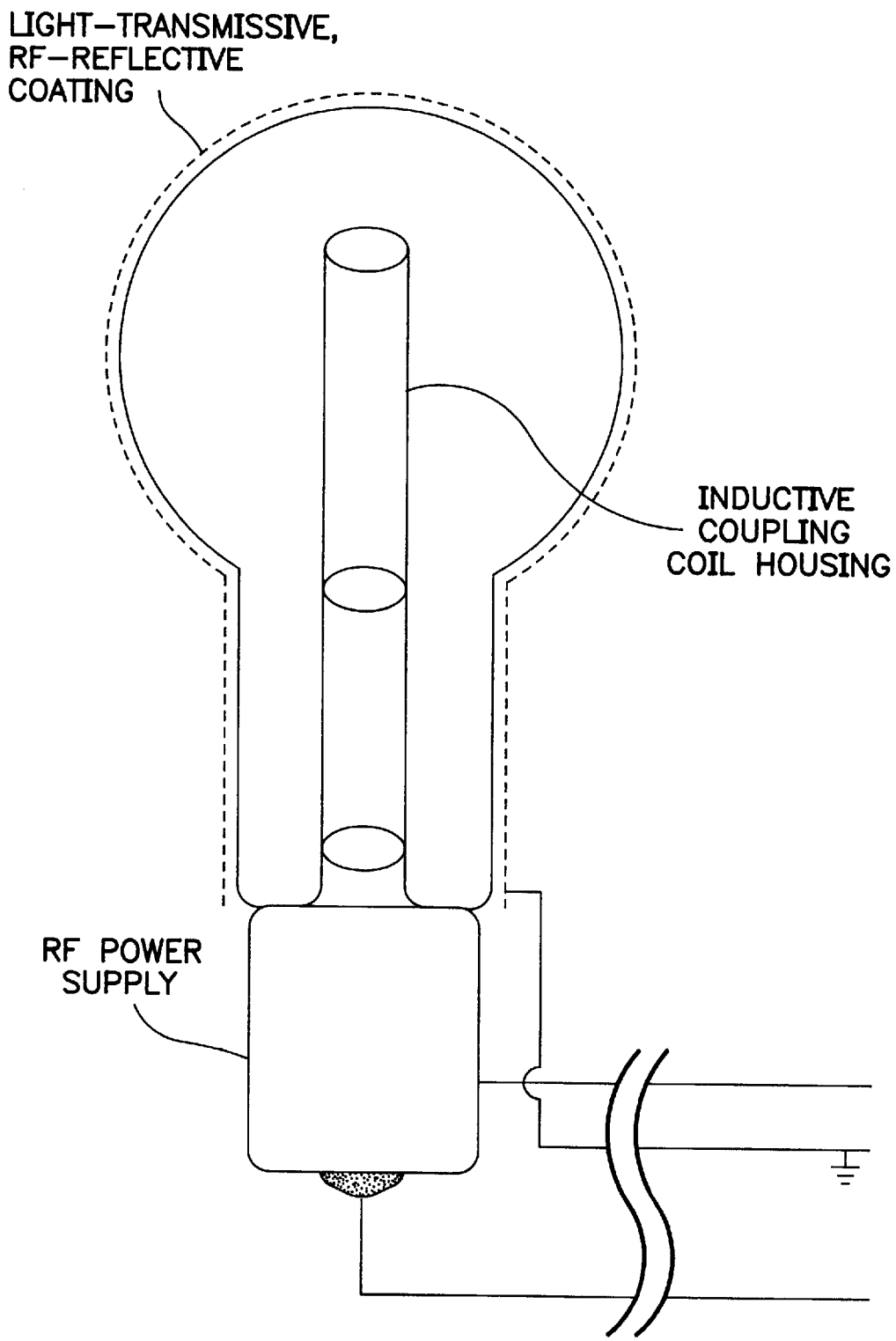
FIG. IA

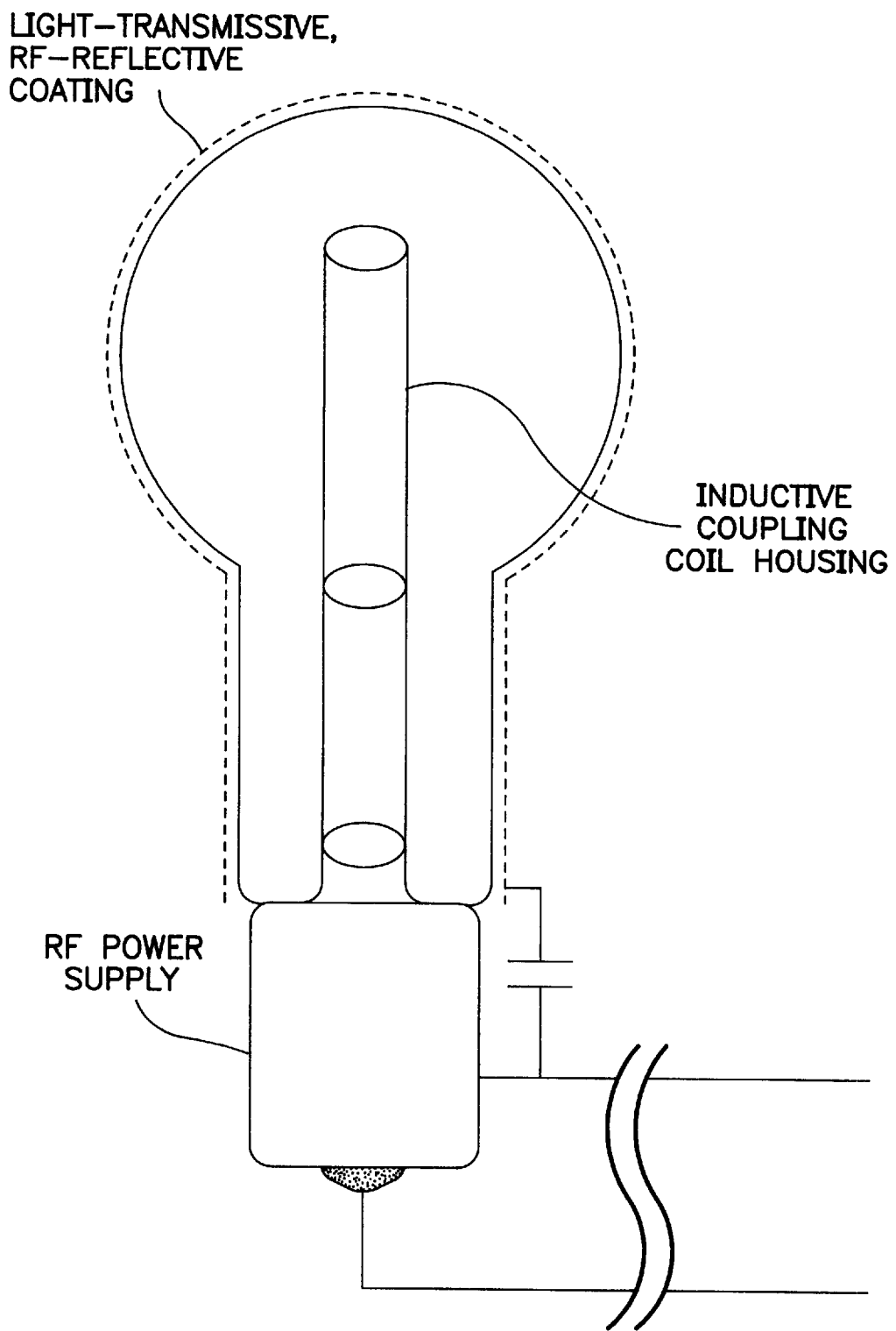
FIG. IB

| RHO (OHM-CM) | DELTA (CM) (13.54 MHZ) | DELTA (CM) (40.62 MHZ) | KAPPA (13.54 MHZ) | KAPPA (40.62 MHZ) |
|---|---|---|---|---|
| 0.100 | 0.433 | 0.250 | 41543.57 | 13847.86 |
| 0.120 | 0.474 | 0.274 | 34619.65 | 11539.88 |
| 0.144 | 0.519 | 0.300 | 28849.70 | 9616.57 |
| 0.173 | 0.569 | 0.328 | 24041.42 | 8013.81 |
| 0.207 | 0.623 | 0.360 | 20034.52 | 6678.17 |
| 0.249 | 0.682 | 0.394 | 16695.43 | 5565.14 |
| 0.299 | 0.747 | 0.432 | 13912.86 | 4637.62 |
| 0.358 | 0.819 | 0.473 | 11594.05 | 3864.68 |
| 0.430 | 0.897 | 0.518 | 9661.71 | 3220.57 |
| 0.516 | 0.982 | 0.567 | 8051.42 | 2683.81 |
| 0.619 | 1.076 | 0.621 | 6709.52 | 2236.51 |
| 0.743 | 1.179 | 0.681 | 5591.27 | 1863.76 |
| 0.892 | 1.292 | 0.746 | 4659.39 | 1553.13 |
| 1.070 | 1.415 | 0.817 | 3882.82 | 1294.27 |
| 1.284 | 1.550 | 0.895 | 3235.69 | 1078.56 |
| 1.541 | 1.698 | 0.980 | 2696.41 | 898.80 |
| 1.849 | 1.860 | 1.074 | 2247.00 | 749.00 |
| 2.219 | 2.037 | 1.176 | 1872.50 | 624.17 |
| 2.662 | 2.232 | 1.288 | 1560.42 | 520.14 |
| 3.195 | 2.445 | 1.411 | 1300.35 | 433.45 |
| 3.834 | 2.678 | 1.546 | 1083.62 | 361.21 |
| 4.601 | 2.934 | 1.694 | 903.02 | 301.01 |
| 5.521 | 3.214 | 1.855 | 752.52 | 250.84 |
| 6.625 | 3.520 | 2.033 | 627.10 | 209.03 |
| 7.950 | 3.856 | 2.227 | 522.58 | 174.19 |
| 9.540 | 4.225 | 2.439 | 435.48 | 145.16 |
| 11.448 | 4.628 | 2.672 | 362.90 | 120.97 |

FIG. IC

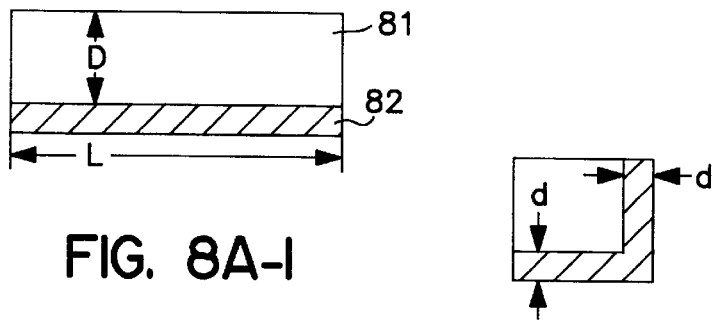
FIG. 8A-1
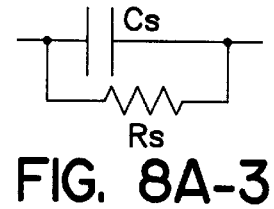
FIG. 8A-2
FIG. 8A-3
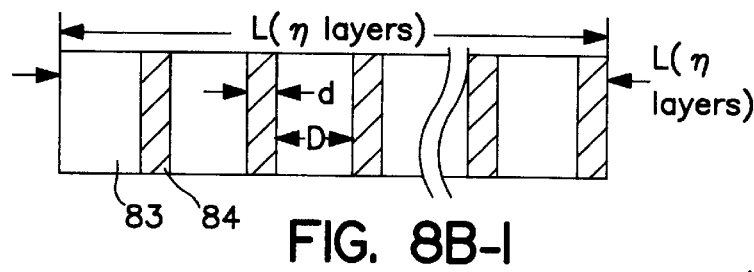
FIG. 8B-1
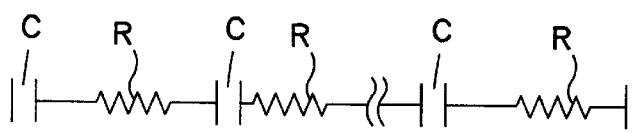
FIG. 8B-2
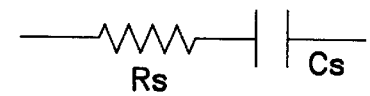
FIG. 8B-3
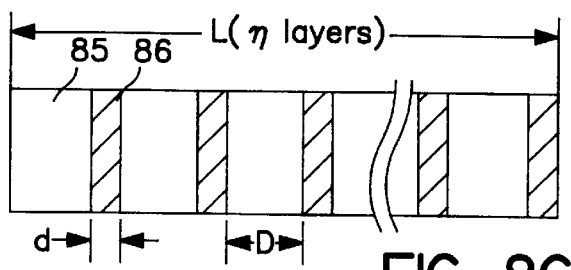
FIG. 8C-1
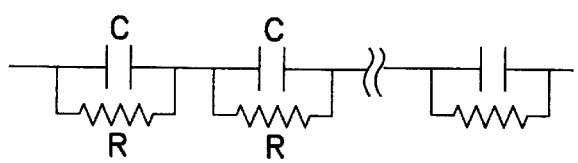
FIG. 8C-2
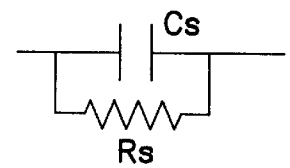
FIG. 8C-3

5,834,904

MEANS FOR SUPPRESSING ELECTROMAGNETIC INTERFERENCE FROM RF-EXCITED LIGHT SOURCES

BACKGROUND OF THE INVENTION

RF-excited electrodeless discharge lamps have in recent years become practical devices used in many lighting applications where their high efficiency and long life offer sufficient advantage to overcome the relatively high cost. A popular form of such a device is the inductively-coupled RF electrodeless lamp, in which the plasma of the discharge serves as a single-turn secondary of a transformer, the multiple-turn primary of which is excited by a solid-state RF power supply which is usually contained within the base of the lamp. The exciting primary coil may be internal to the discharge, typically mounted in a re-entrant well protruding into the interior volume of the lamp, or may be external, in the vicinity of the equator of an approximately spherical discharge vessel. The plasma may either be of the low-pressure mercury/rare-gas type producing ultraviolet light for exciting a phosphor, or it may be of the high-pressure metal halide type. Excitation frequencies may vary from a few MHz (used with a ferrite-core transformer) to the ISM frequency of 13.54 MHz.

A serious technical problem in such devices is the potential emission of ElectroMagnetic Interference (EMI) at the fundamental and harmonics of the excitation frequency (principally from the exciting coil) as well as at other frequencies which may be generated by the plasma itself. The former, of course, is at discrete frequencies in relatively narrow frequency bands, while the latter may be broad-band in nature. In the U.S., the 13.54±0.05 MHz band is reserved for such non-communication services, as are the second and third harmonics thereof at 27.08 and 40.62 MHz. EMI within these bands is not regulated. However, any broad-band EMI generated by interaction of the plasma and the power source as well as any higher harmonics of the exciting frequency would interfere with communication services, and is stringently regulated. Means of suppression of such emissions is therefore an integral part of any lighting system employing such lamps.

To increase the flexibility of application, it is desirable that such EMI-suppressing means be in fact integral to the lamp itself. Thus such a lamp could be used in many fixtures or portable lamps not having EMI-suppression capabilities since they were originally designed for incandescent lamps. It is known to the prior art, as shown for example in U.S. Pat. No. 4,568,859 by Hoekes, Dennemans and Postma, to employ a transparent conductive coating such as indium-tin-oxide disposed on the outer surface of the lamp, and electrically connected to one of the power-supply leads, as is shown in FIG. 1A herein, where the conductive film is connected directly to the ground wire of a three wire system, while in FIG. 1B (herein) the connection is shown through a capacitor to one of the AC power-line leads itself, for use in two-wire systems not having a separate ground connection. The size of the capacitor is chosen to have low impedance at the RF frequency and high impedance at the AC line frequency.

Such thin conductive films do not absorb electromagnetic radiation. They reflect most of it. But radiation which is not reflected is transmitted. The electric field component normal to the surface induces time-varying charges in the transparent conductor. The currents which flow into and out of the film by virtue of these time-varying charges and its connection to ground through the power line constitute the only means of dissipation of electromagnetic power. In many applications, there may be considerable length of electrical conductor, some meters in fact, between the light source and a true earth ground. Since one-quarter wavelength at 13.54 MHz is 5.5 meters, such conductors to which EMI has been diverted may well be excellent antennas. Thus, the prior-art method of suppressing EMI merely transforms EMI directly radiated from the source into EMI conducted by the power line to be subsequently radiated thereby.

It is a principal object of the present invention to provide an improved means of suppression of EMI from RF-excited electrodeless discharge light sources which provides a true absorption and conversion to heat of the unwanted EMI and does not divert it to the power line.

It is a further object of the present invention to provide reflective enclosures for EMI suppression which incorporate true absorbers that convert incident electromagnetic energy to heat.

It is still a further object of the invention to provide reflective layers having reflectance substantially greater than 90%, whereby greatly-improved suppression of EMI is achieved.

SUMMARY OF THE INVENTION

These objects are realized through provision of an electrodeless discharge lamp with these elements:

a) means defining an RF-excited electrodeless light source, b) means defining an RF-reflective light transmissive enclosure, within which the light source is contained having an RF reflectance, at least equal to and preferably substantially greater than 90% at all RF frequencies for which suppression is desired and a visible light transmission in excess of 90%, the RF-reflective enclosure being constructed and arranged so that it is not coupled to external power-line connections; and c) means defining an absorber of RF power at all frequencies for which suppression of EMI is desired, contained within the enclosure, the absorber having an absorption coefficient greater than 40%, a transmission coefficient less than $e^{-3}$, and an effective area facing the interior of the enclosure between 5% and 40% of the area of the RF-reflective light transmissive enclosure. The absorber can be a special material and/or reactive circuit made up of passive components (R, L, C).

Through operation of these structural elements a reduction in emitted EMI power of a factor at least 2.5 (4 dB)is achieved without transmission of EMI to the power lines, the suppressed EMI being converted to heat in the absorber.

Other objects, features and advantages of the invention will be apparent from the following detailed description of preferred embodiments taken in conjunction with the accompanying drawings in which:

BRIEF DESCRIPTION OF THE DRAWINGS

FIGS. 1A and 1B are cross-section sketches of state-of-the art (prior art) lamps showing the above-discussed features and FIGS. 2–4 and 7a/7b are similar sketches showing preferred embodiments of the present invention;

FIG. 1C is a table of skin depth "Delta", -and dielectric coefficient "Kappa" (for r [reflectance]=0.5) vs. rho (resistivity);

FIGS. 8A, 8B and 8C (each having subsidiary portions, i.e. 8A-1, 8A-2, 8A-3 B-1, 8B-2, 8B-3, 8C-1, 8C-2, 8C-3) are diagrams of alternative heterostructures usable in lieu of single materials as RF absorbers in practice of the invention.

DESCRIPTION OF PREFERRED EMBODIMENTS

Figure 2:
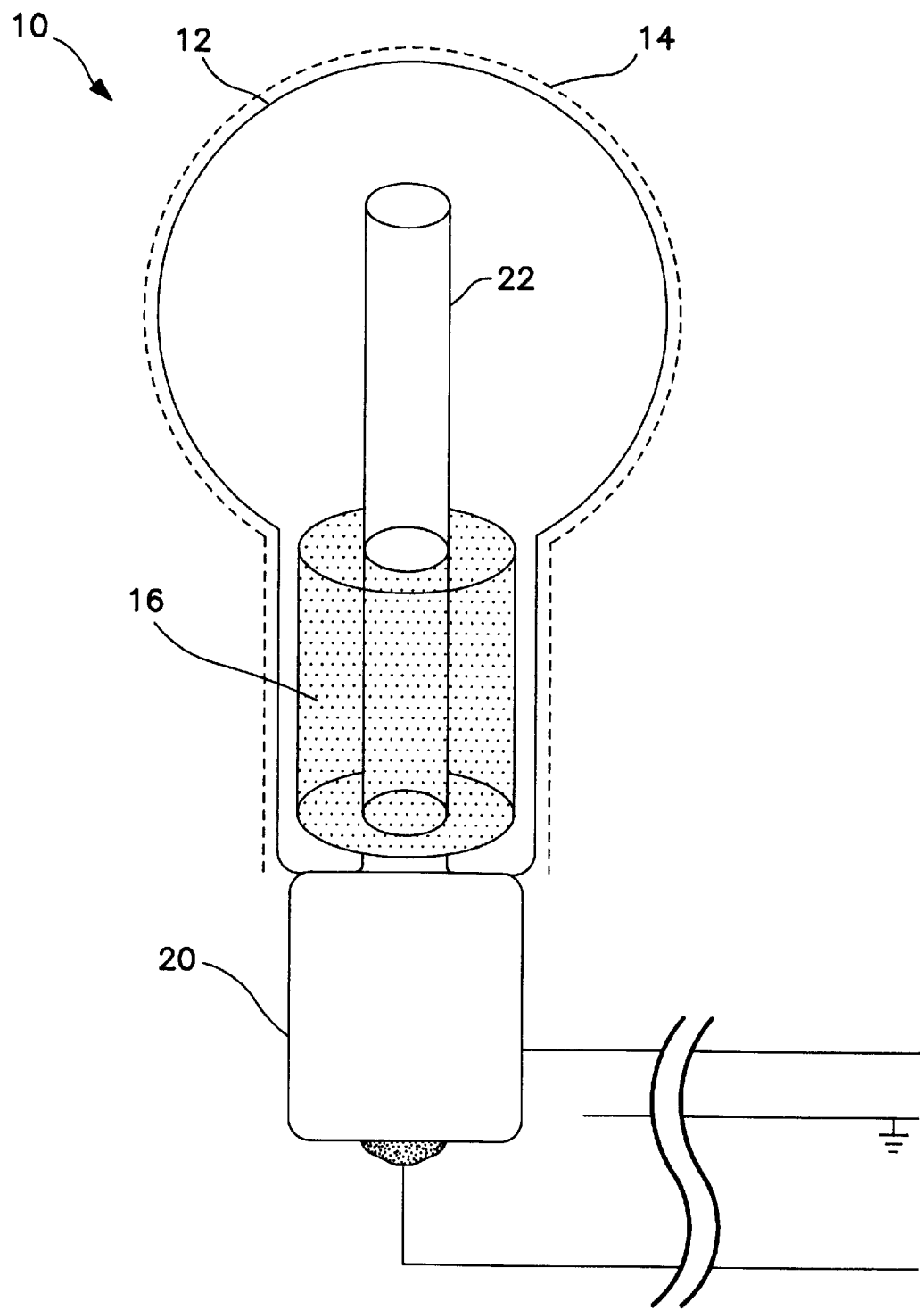

The arrangement of the prior art (FIGS. 1A, 1B), employing an RF-reflective layer substantially surrounding a source of RF emission, exhibits many of the characteristics of an integrating sphere (such as might be used for luminous-flux measurements). The reflective enclosure is relatively large in comparison to the primary source; it has a reflectivity of the order of 90% or greater and it has an irregular shape. Thus there are many reflections of electromagnetic waves within the enclosure before escape by transmission. Because the entire device is much smaller than a wavelength, with multiple reflections, virtually all possible phases of EM waves are present everywhere within the enclosure. Thus, the reflected powers add incoherently, exactly as in a light flux integrating sphere so large in comparison to a wavelength that interference phenomena may be ignored. One may therefore analyze the RF flux density in such an enclosure using equations closely analogous to those of the integrating sphere.

Let $P_s$ be the primary radiated source power of RF, in watts. For a source of area $A_s$, one can approximate the radiation flux density at the source as:

$$F_S = P_S/A_S \text{ watts/cm}^2 \qquad \text{(I)}$$

Let $F_r$ be the randomized incoherent radiation flux density that builds up within the enclosure. The condition determining the value of $F_r$ is that the power dissipation due to transmission of this flux density through the walls of the enclosure plus the absorption of this flux by any absorbers which may be present must equal the total power input from the source. Assuming that the reflective enclosure wall has an area $A_r$, transmission $T_r$ equal to $(1-R_r)$, and that the enclosure incorporates an absorber of area $A_a$ presented to the interior of the enclosure and absorption coefficient ($\alpha$) approximately equal to $(1-R_a)$, and neglecting reabsorption in the source, the enclosure flux density is determined from:

$$F_r(1-R_r)A_r + F_r(1-R_a)A_a = P_s = F_s A_s \qquad \text{(II)}$$

Solving for $F_r$, $$F_r = \frac{P_s}{(1-R_r)A_r + (1-R_a)A_a} \qquad \text{(III)}$$

The EMI power emitted ($P_{EMI}$) is then the product of this flux density times the area of the reflective enclosure times the transmission of the reflector $$P_{EMI} = F_r(1-R_r)A_r = \frac{P_s}{(1-R_r)A_r + (1-R_a)A_a}(1-R_r)A_r \qquad \text{(IV)}$$

$$P_{EMI} = \frac{P_s}{1 + K_a/(1-R_r)} \qquad \text{(V)}$$

(VI) The quantity $K_a$ the "Absorption Factor" is given by:

$$K_a = \frac{(1-R_a)A_a}{A_r} = \frac{\alpha_a A_a}{A_r}$$

It is equal to the absorption coefficient times the ratio of absorber area to reflective enclosure area. Note that if the absorption coefficient $\alpha_a$ is zero, the EMI power emitted is the same as the source power. That is to say, purely reflective enclosures provide no reduction of EMI regardless of the reflectivity of the enclosure. The incoherently-reflected flux density within the enclosure increases to the point that the transmitted power equals the source power. In fact, significant reduction in EMI is obtained only if the absorption factor is very much greater than enclosure transmittance. Since absorber area $A_a$ is likely to be substantially less than the area $A_r$ of the optically transparent RF-reflective enclosure, the absorption factor is generally significantly less than 1. Large reductions in emitted EMI are obtained only at small transmittances, i.e. $R_r$ approaching 100 percent.

The foregoing analysis suggests that the prior art connection of a reflector to the power line provides a surrogate for true absorption, with the disadvantages already cited. Moreover, the reflectance for RF of the optically-transparent indium-tin-oxide coating is well below 90%. For an effective absorber area 20% of the RF-reflector area and unity absorption coefficient, this results in a three-fold reduction in EMI, a relatively modest 5 dB.

FIG. 2 shows an electrodeless discharge lamp 10 according to a preferred embodiment of the present invention, in which a light-transmissive, RF-reflective layer 14 is applied to the outer surface of the enclosing bulb 12. The lamp is an inductively-coupled RF-excited lamp. The purpose of the reflective layer is to provide reflectance over 90% for improved EMI suppression. Disposed within the RF-reflecting enclosure created thereby is a dielectric-resistive absorbing material 16. That absorber should be of sufficient thickness to have less than $e^{-3}$ transmittance of RF power, while simultaneously having a reflectance for RF power less than 60% and a corresponding absorption coefficient $\alpha_a$ greater than 0.4. The characteristic of less than $e^{-3}$ transmittance is achieved by having the thickness of the absorbing layer equal to or greater than three times the so-called "skin depth" of the dielectric-resistive absorbing material. The properties of material which are required for such an absorber are discussed in more detail below in connection with the Table of FIG. 1C.

The lamp 10 comprises an rf-power supply 20 and a reentrant well 22 for an inductive coupling coil of the supply which effectively excites a gas in the lamp bulb. Although the absorber is shown in FIG. 2 disposed within the glass vessel, this is not essential. However, if it is external to the glass vessel, it must still be within an RF-reflective enclosure that is connected to the transparent RF reflector disposed on the surface of the bulb, thereby being a part of the reflective enclosure component of the EMI-suppressing means. A constraint upon the position of the absorber, moreover, is that it must not couple significantly to the magnetic induction field of the primary exciting coil; thus, it must be several coil diameters away from that component.

Figure 3:
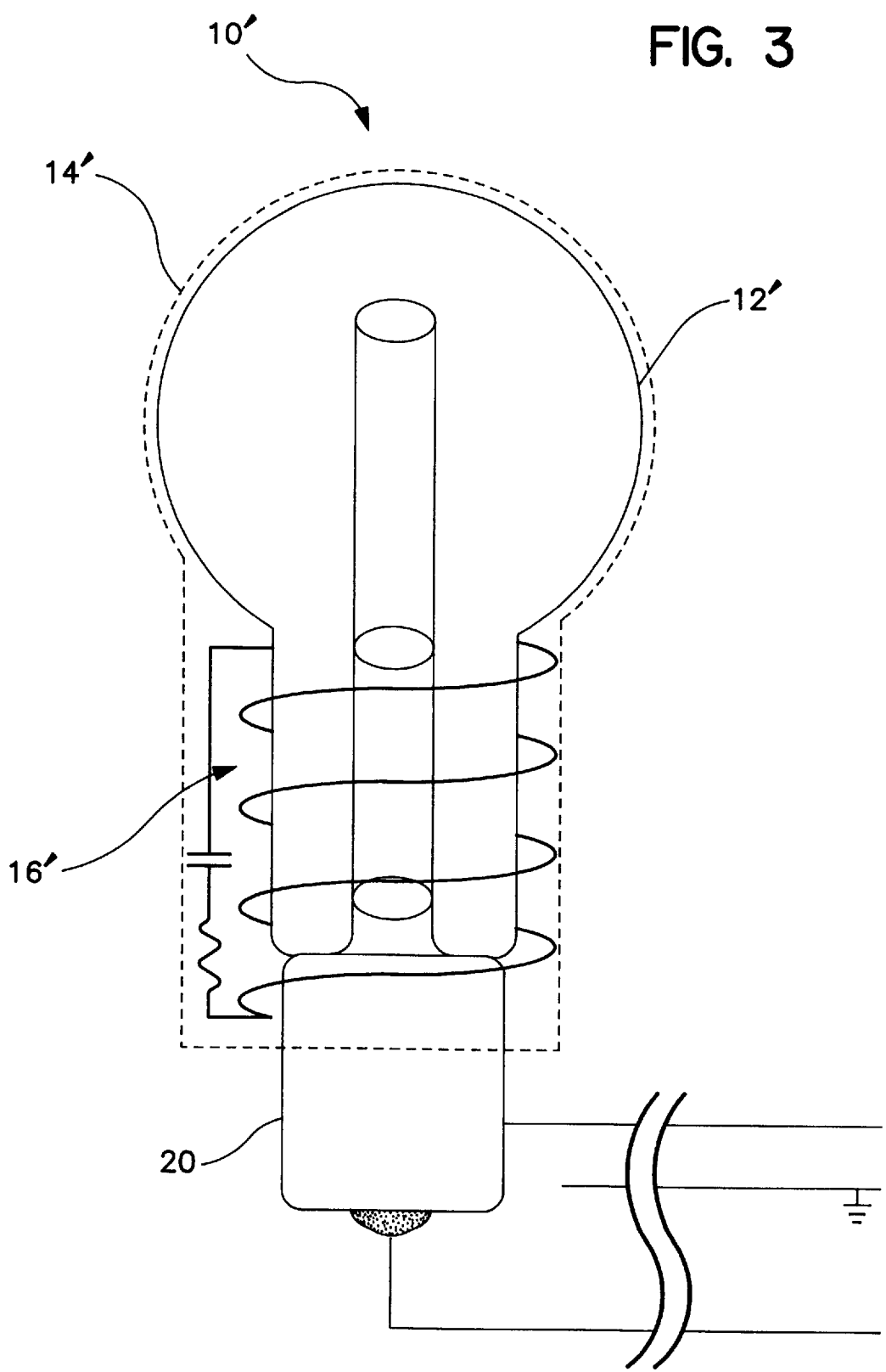

An alternate preferred embodiment of the invention shown in FIG. 3 is a lamp 10' which employs a critically damped resonant L-C-R circuit as the absorber 16'. Critical damping is achieved by having $$R = \omega L, \text{ with } \omega = 1/(LC)^{1/2} = 2\pi f$$

where f is the frequency to be suppressed. Electromagnetic power directed toward this L-C-R circuit by the reflective enclosure is approximately 50% reflected and 50% absorbed in the resistance. Thus, at the resonance frequency, $\alpha_a$ is approximately equal to 0.5. Such an embodiment might be conveniently employed to suppress specific harmonics of the excitation frequency, i.e. the fourth harmonic at 54.16 MHz. Because the Q of the circuit is in fact equal to unity, the bandwidth over which absorption is high will nevertheless be quite broad, from approximately 27 to 81 Mhz for a 54 MHz center frequency. One can combine the embodiments of FIGS. 2 and 3 to suppress not only broad-band EMI but also to provide enhanced suppression at selected harmonics of the excitation frequency. One can also provide multiple L-C-R circuits tuned to different center frequencies to expand the bandwidth of the EMI suppression. Such combinations are within the scope of the teachings herein and within the scope of the present invention.

Because all such means will add cost to the lamp, it may be advantageous in many applications to make the EMI suppression a function of the fixture; this will be especially true in commercial applications, such as recessed downlights or the like. For this purpose, the lamp 10" embodiment shown in FIG. 4 can be utilized. In this lamp, the optical reflector 32 of an enclosed fixture 30 is used as a part of the RF reflective enclosure. A light transmissive, RF-reflective layer is disposed upon the light transmissive lens 34 or between the lamp and the lens, the light transmissive RF-reflective layer being bonded to the RF-reflecting optical reflector. The combination of RF-reflecting optical reflector plus the light-transmissive RF-reflecting layer comprise the RF-reflecting enclosure component of the EMI-suppressive means.

Figure 4:
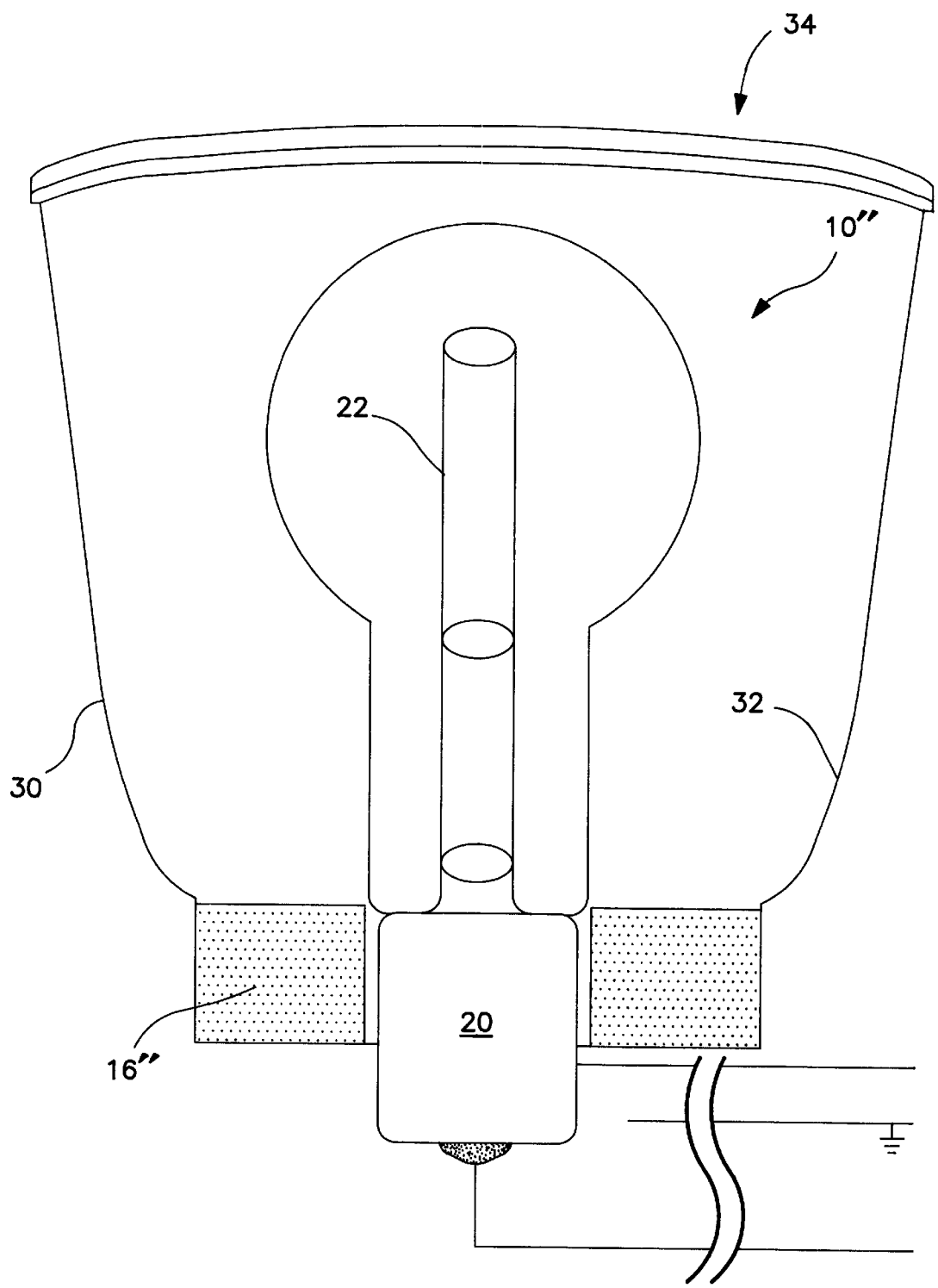

The absorbing means 16" is disposed within the RF cavity created by the RF-reflecting enclosure; in the diagram of FIG. 4, this is shown surrounding the neck of the bulb. This is not an essential requirement, but is merely convenient; in this region, the absorbing means has minimal interference with the gathering and focussing of light by the optical reflector-lens combination.

An L-C-R critically-damped resonant absorber circuit may be disposed within the fixture cavity either in place of or together with the dielectric-resistive absorber means. Such modification is also within the scope of the invention.

The dielectric-resistive absorber material described in connection with FIG. 2 must have simultaneously a reasonably small skin depth (in order that it may be three or more skin depths thick without being too large in dimension) together with an RF reflectance of the order of 50%. These two requirements constitute conditions on the resistivity and on the dielectric coefficient.

The skin depth of a conducting medium is given by:

$$\delta^2 = \rho(2/\omega\mu 0) \text{ (SI Units)} \tag{VII}$$

The RF-reflectance of a conductive dielectric medium is given by:

$$R = 1 - 2(2\omega\kappa \in 0\rho)^{1/2} \text{ (SI Units)} \tag{VIII}$$

in which $\in 0$ and $\mu 0$ are, respectively, the dielectric permittivity and magnetic susceptibility of free space, $\omega$ is the radian frequency, $\rho$ is the resistivity, and $\kappa$ is the dielectric coefficient of the material. The requirement that reflectance be less than or equal to 0.5 means that the second term in Eq(VII) must be greater than or equal to 0.5. Solving for $\kappa$, $$\kappa = 0.03125/(\omega \in 0\rho) \text{ (SI Units)} \tag{IX}$$

Figure 5:
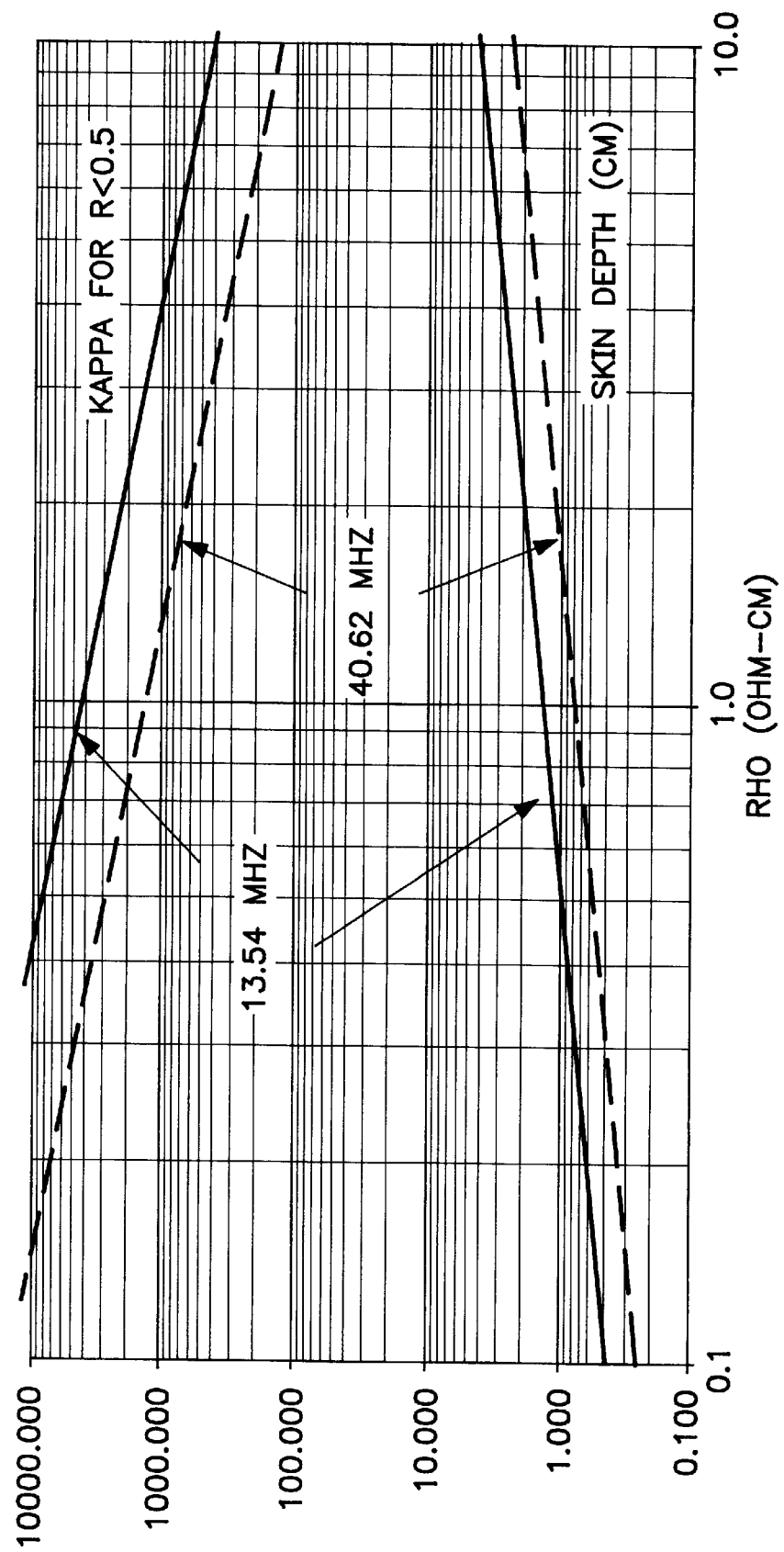
FIGS. 5–6 are plots of EMI vs. reflector transmittance under conditions stated at each such plot.

The table of FIG. 1C gives calculated values of $\kappa$ and $\delta$ (in centimeters), as a function of resistivity in ohm-cm for the fundamental and third harmonic frequencies of the ISM band. FIG. 5 is a plot of the data of FIG. 1C table. At the third harmonic, skin depth less than one centimeter (permitting absorber thickness less than 3 cm) can be achieved for resistivity of 1 ohm-centimeter. At 1 ohm-cm resistivity, the required value of dielectric coefficient is about 1200. At the fundamental frequency, the resistivity required is 0.6 ohm-cm with a dielectric coefficient of 6000.

Dielectric coefficients of several thousand or more are conveniently available in barium titanate capacitor materials. Although barium titanate may be prepared in a semiconducting state for positive-temperature-coefficient thermistors, the resistivity achieved is typically at least an order of magnitude greater than the 1 ohm-cm required.

Thus, the combination of dielectric coefficient and resistivity required is best obtained from a composite mixture, such as barium titanate and graphite. The resistivity of bulk graphite at ambient temperatures is about 800–3000 micro-ohm-cm. A possible mixture could be prepared from a slurry of particulate barium titanate with powdered graphite in dilute sodium silicate solution ("Aquadag") in such proportions as to have the desired resistivity. Following drying to a damp paste, suitable solid bodies may be fabricated by mechanical pressing and final drying. The sodium silicate serves as binder to maintain the dimensional integrity of the dried body. Alternatively, a layered structure of alternate thick layers of barium titanate and thin layers of graphite slurry should have the necessary properties provided all layers were thin in comparison to the desired skin depth.

The foregoing is cited as an example, to demonstrate that RF absorbing materials having the properties of resistivity and dielectric coefficient necessary for the invention can be prepared. Other methods of achieving the same combination of properties are within scope of the present invention, and are exemplified by heterostructures shown in FIGS. 8A, 8B, 8C and described as follows.

FIG. 8A, comprising face and end views 8A-1, 8A-2 and an equivalent circuit diagram, 8A-3 shows a columnar heterostructure comprising high dielectric constant insulator elements 81 in parallel with thinner layers of resistive materials 82. The thickness d of the resistive layers is very much less than the transverse dimension D of the dielectric elements. As the diagram (8A-3) illustrates, the equivalent circuit of this structure is that of a resistor $R_s$ in parallel with a capacitor $C_s$. Equations (X)–(XIII) below describe the system.

$$C_s = \frac{\kappa \epsilon_0 D^2}{L} = \frac{\kappa_{eff} \epsilon_0 A}{L} \tag{X}$$

$$R_s = \frac{\rho L}{2dD} = \frac{\rho_{eff} L}{A} \tag{XI}$$

$$\kappa_{eff} = \frac{\kappa D^2}{(d+D)^2} \approx \kappa \tag{XII}$$

$$\rho_{eff} = \frac{(d+D)^2 \rho}{2dD} \approx \frac{D}{2d} \rho \tag{XIII}$$

The effective dielectric constant of the heterostructure is approximately that of the dielectric material itself; the effective resistivity is D/2 d times the resistivity of the resistive material. To achieve 1 ohm-cm effective resistivity using, e.g., "Aquadag"™ brand paste as the resistive material (800–3000 micro-ohm-cm) would require D/2 d=330. If the dielectric elements were granules 0.1 mm in dimension, the resistive layers 82 would have to be 1500 Angstroms thick.

FIG. 8B illustrates (at 8B-1) a layered structure, in which layers 83 of high-dielectric constant insulator materials are sandwiched between layers of resistive materials 84, again with dimension D of the dielectric material being very much greater than dimension d of the resistive layers. As the figure indicates, the equivalent circuit of this heterostructure (8B-2) is that of a series string of series-resistor-capacitor pairs. This can be reduced to the further-simplified equivalent circuit (8B-3) of a single resistor-capacitor pair. Equations (XIV)–(XXI) below, describe the system:

$$C = \frac{\kappa \epsilon_0 A}{D} \tag{XIV}$$

$$R = \frac{\rho d}{A} \tag{XV}$$

$$X_c = \frac{1}{\omega C} \tag{XVI}$$

$$Z = NR + jNX_c = NR + jN/\omega C \tag{XVII}$$

$$C_s = \frac{C}{N} = \frac{\kappa \epsilon_0 A}{ND} = \frac{\kappa_{\mathit{eff}} \epsilon_0 A}{L} \tag{XVIII}$$

$$R_s = NR = \rho_{\mathit{eff}} L/A \tag{XIX}$$

$$\kappa_{\mathit{eff}} = \frac{L}{ND} \kappa \approx \kappa \tag{XX}$$

$$\rho_{\mathit{eff}} = \frac{Nd}{L} \rho \approx \frac{d}{D} \rho \tag{XXI}$$

From this final equivalent circuit the effective dielectric constant of the heterostructure (approximately equal to that of the high-dielectric material itself) and the effective resistivity of the composite material can be deduced. The latter is d/D times the instrinsic resistivity of the resistive material. For dielectric layers of 0.1 mm thickness, and resistive material of resistivity of 100 ohm-cm the resistive layers would have to be 10,000 Angstroms thick.

FIG. 8C illustrates (at 8C-1) an alternative layered heterostructure comprising alternate layers of high and low resistivity materials. The resistivity of the low resistivity layers 85 must be very much less than that of the high resistivity layers 86, but the layer thickness must be less than the skin depth in that material. At 13.54 MHz, nichrome (resistivity of 100 micro-ohm-cm) has a skin depth 0.017 cm. Again the ratio d/D is very much less than unity. This heterostructure can be represented by an equivalent circuit (8C-2) of capacitors in parallel with resistors, which can be further reduced to the simplified circuit of a single capacitor in parallel with a resistor. Equations (XXII)–(XXVII) describe the system.

$$C = \frac{\kappa \epsilon_0 A}{d} \tag{XXII}$$

$$R = \frac{\rho d}{A} \tag{XXIII}$$

$$C_S = \frac{C}{N} = \frac{\kappa \epsilon_0 A}{Nd} = \frac{\kappa_{\mathit{eff}} \epsilon_0 A}{L} \tag{XXIV}$$

$$R_s = NR = \rho Nd/A = \rho_{\mathit{eff}} L/A \tag{XXV}$$

$$\kappa_{\mathit{eff}} = \frac{L}{Nd} \kappa \approx \frac{D}{d} \kappa \tag{XXVI}$$

$$\rho_{\mathit{eff}} = \frac{Nd}{L} \rho \approx \frac{d}{D} \rho \tag{XXVII}$$

The effective dielectric constant of the heterostructure is D/d times that of the high-resistance material; the effective resistivity is Nd/L=d/D times the resistivity of the resistive material. For high resistivity material of 1000 ohm-cm and low-resistivity material of 100 ohm-cm as layers of 0.1 mm thickness, the high-resistivity layers would be 1000 Angstroms thick. If the high-resistivity layers had a dielectric constant equal to 2, the effective dielectric coefficient of the heterostructure would be 2000.

Thus it can be seen that there are a variety of heterostructures possible for composite materials having the desired effective values of dielectric constant and resistivity; reasonable values of dimensional ratios to serve as starting points for iterative trials, within a reasonable scope, can be deduced by those skilled in the art from equivalent circuits of these heterostructures and the intrinsic properties of the component materials themselves.

Figure 6:
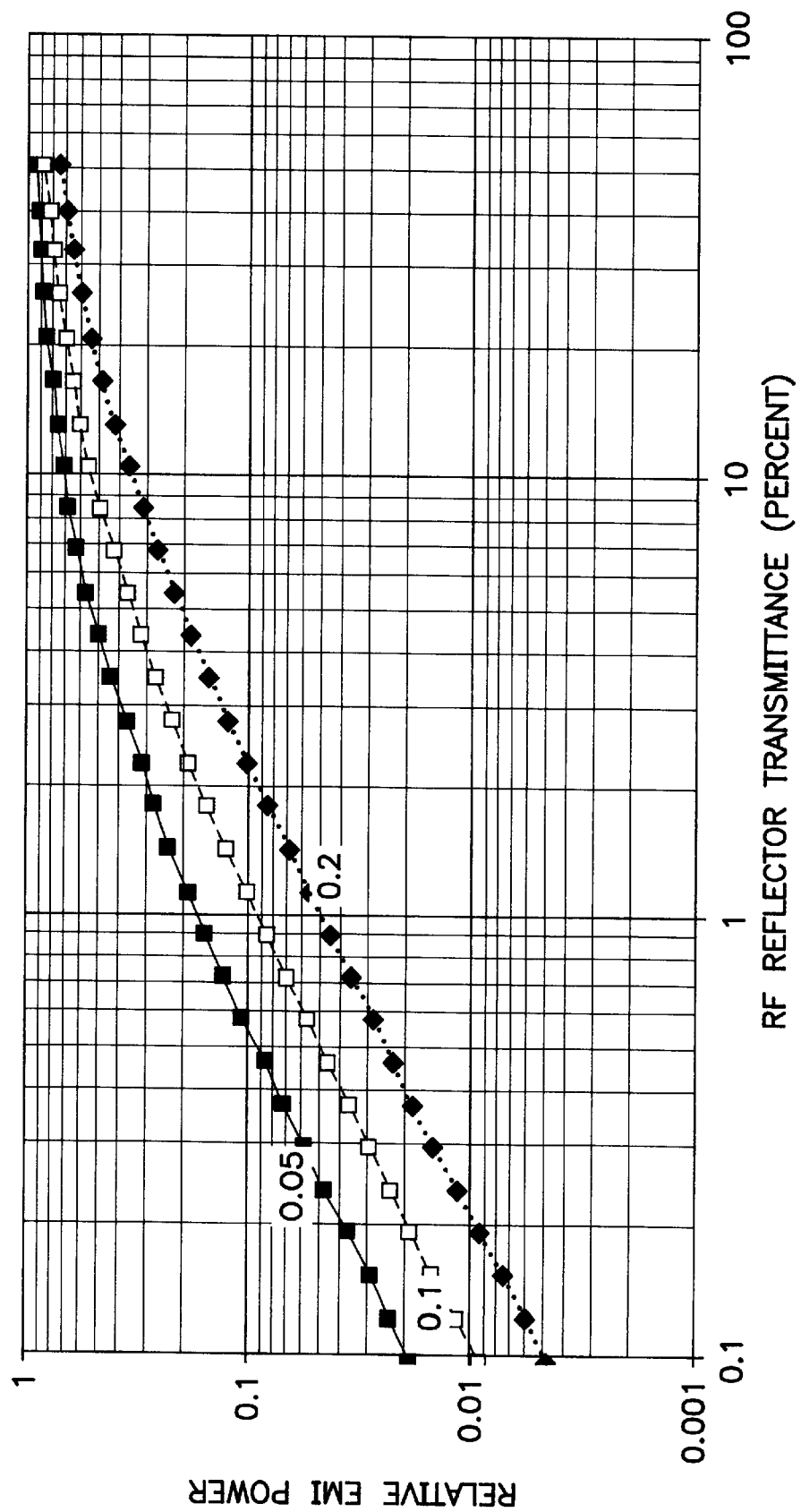

FIG. 6 is a plot of the relative EMI power emitted as a function of RF reflector transmittance, for various values of absorption factor $K_a$. This was done to assess influence of reflectance of the rf-reflecting layer. Such a range of absorption factors would be generated for absorption coefficient $\alpha_a$=0.5 and the ratio of absorber area to RF-reflector area 0.1, 0.2, and 0.4, respectively. As can be seen, for this range of absorption factors, suppression of EMI by more than a factor 10 (10 dB) requires RF transmittances less than 1%. To approach a factor 100 (20 dB) suppression would require RF-reflector transmittance of order 0.1%, i.e. RF- reflectance of the order of 99.9%. Both of these are far beyond the capability of indium-tin-oxide films.

Consider instead a reflective layer made of electrodeposited silver, with a resistivity of $2 \times 10^{-6}$ ohm–cm=$2 \times 10^{-8}$ ohm–m. At 13.54 MHz, it will have a skin depth of 19 micrometers, about one-half mil. An 80 micrometer thick layer (about 2 mils) is four skin depths thick, essentially infinite in thickness. The value of reflectance of a continuous sheet at 13.54 MHz, from Eq(IV), is R=1−0.00011= 99.999%. The reflectance of a perforated sheet can be estimated using the conducting area fraction $f_a$ as a correction to the resistivity, provided the remaining conductors are all connected, and the separation of conductors is small in comparison to a wavelength:

$$R = 1 - 2(2\omega\kappa\epsilon_0\rho/f_a)^{1/2} \text{ (SI Units).} \tag{XXVIII}$$

For a perforated sheet having 99% open area and one percent connected silver strips, $$R = 1 - 0.0011 = 99.9\% \tag{XXIX}$$

Such a sheet would also have optical transmission of 99%, thus having little or no adverse effect on luminous emission. Indium-tin-oxide films of sufficiently low sheet resistivity to be useful as RF reflectors have optical transmission less than 90%. The patterned-silver reflector is more optically-transparent as well as more RF-reflective.

Figure 7A:
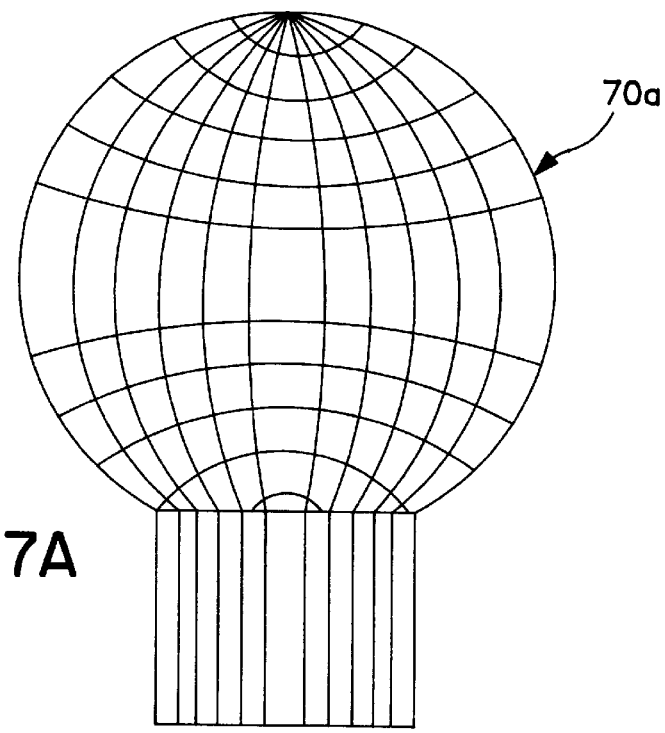
FIGS. 7A and 7B are diagrams illustrating possible decorative patterns for imprinting a screen-type reflective layer upon the surface of the envelope of an RF-excited electrodeless lamp.
Figure 7B:
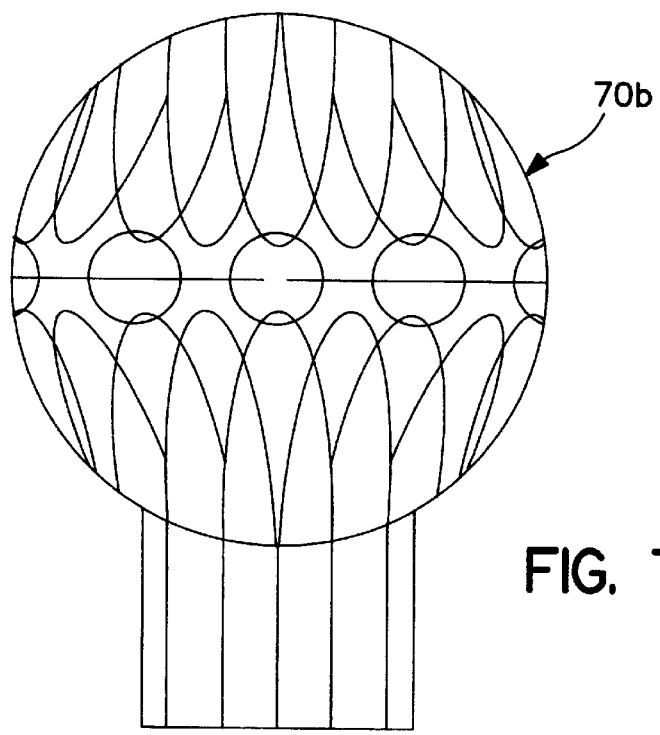

Such a patterned-silver reflective layer can be applied by electrodeposition of a continuous film on the surface of the bulb followed by photolithographic removal of areas intended to be open. Alternatively, a somewhat lower-performance layer could be applied by silk-screening or other printing of silver-ink patterned layers. Such patterned-silver reflective layers may be applied in decorative patterns, enhancing the appearance of the unlighted bulb. Examples are shown as lamps 70a and 70b in FIGS. 7A, 7B, respectively. Such patterning does not affect, substantially, the utilitarian light output of the lamp nor the EMI suppression structures and methods described above.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. An electrodeless discharge lamp comprising:
   a) means defining an RF-excited electrodeless light source,
   b) means defining an RF-reflective light transmissive enclosure, within which the light source is contained, having an RF reflectance greater than 90% at all RF frequencies for which suppression is desired and a visible light transmission in excess of 90%,
   said RF-reflective enclosure constructed and arranged so that it is not coupled to external power-line connections; and
   c) means defining an absorber of RF power, at all frequencies for which suppression of EMI is desired, contained within said enclosure, said absorber having an absorption coefficient greater than 40%, a transmission coefficient less than $e^{-3}$, and an effective area facing the interior of the enclosure between 5% and 40% of the area of the RF-reflective light transmissive enclosure,
   whereby a reduction in emitted EMI power of a factor at least 2.5 (4 dB) is achieved (relative to emitted EMI power generated by operation of said lamps at a given exciting power level without said reflectance, absorption criteria) without transmission of EMI to the power lines, said suppressed EMI being converted to heat in said absorber.

2. An electrodeless discharge lamp comprising:
   a) means defining an RF-excited electrodeless light source,
   b) means defining an RF-reflective light transmissive enclosure, within which the light source is contained having an RF reflectance greater than 90% at all RF frequencies for which suppression is desired and a visible light transmission in excess of 90%,
   said RF-reflective enclosure constructed and arranged so that it is not coupled to external power-line connections; and
   c) means internal to the enclosure for absorbing RF power at target EMI suppression frequencies and having no other function.

3. An electrodeless discharge lamp comprising:
   a) means defining an RF-excited electrodeless light source,
   b) means defining an absorber of RF power, at all frequencies for which suppression of EMI is desired, contained within said enclosure, said absorber having an absorption coefficient greater than 40%, a transmission coefficient less than $e^{-3}$, and an effective area facing the interior of the enclosure between 5% and 40% of the area of the RF-reflective light transmissive enclosure; and
   c) means associated with the enclosure for reflecting over 90% of source energy radiated at the enclosure from within while passing over 90% of visible light from gas discharge excited by the source.

4. A lamp in accordance with either of claims 1 or 3 wherein the absorber comprises an absorbing material exhibiting an effective resistivity in the range of 0.1 to 10 ohm-cm and dielectric coefficient in the range of 200 to 20,000.

5. A lamp in accordance with claim 4 wherein the material comprises a composite of barium titanate and a carbonaceous material.

6. A lamp in accordance with claim 5 wherein the composite is a fired mixture of said materials.

7. A lamp in accordance with claim 4 wherein the composite absorber is a thinly layered laminate of selected materials.

8. A lamp in accordance with either of claims 1 or 3 wherein the absorber comprises a critically damped resonant circuit.

9. A lamp in accordance with either of claims 1 or 3 employing combined materials/circuit absorption means.

10. An electrodeless discharge lamp comprising:
    a) means defining an RF-excited electrodeless light source,
    b) means defining an RF-reflective light transmissive enclosure, within which the light source is contained having an RF reflectance greater than 90% at all RF frequencies for which suppression is desired and a visible light transmission in excess of 90%,
    said RF-reflective enclosure constructed and arranged so that it is not coupled to external power-line connections; and
    c) means for absorbing RF power at target EMI suppression frequencies;
    and wherein the absorber comprises an absorbing material exhibiting an effective resistivity in the range of 0.1 to 1.0 ohm-cm and dielectric coefficient in the range of 200 to 20,000.

11. A lamp in accordance with claim 10 wherein the material comprises a composite of barium titanate and a carbonaceous material.

12. A lamp in accordance with claim 11 wherein the composite is a fired mixture of said materials.

13. A lamp in accordance with claim 10 wherein the absorber is a thinly layered laminate of selected materials.

14. A lamp in accordance with claim 2 wherein the absorber comprises a critically damped resonant circuit, said circuit having a resonant frequency greater than or equal to the fundamental operating frequency of the lamp and having no connection to the energizing circuit.

15. A lamp in accordance with claim 2 employing combined materials/circuit absorption means.

* * * * *